INVENTORS
GEORGE J. TOPOL
BARRY A. HINKLE
by Albert L. Jeffers.
Attorney

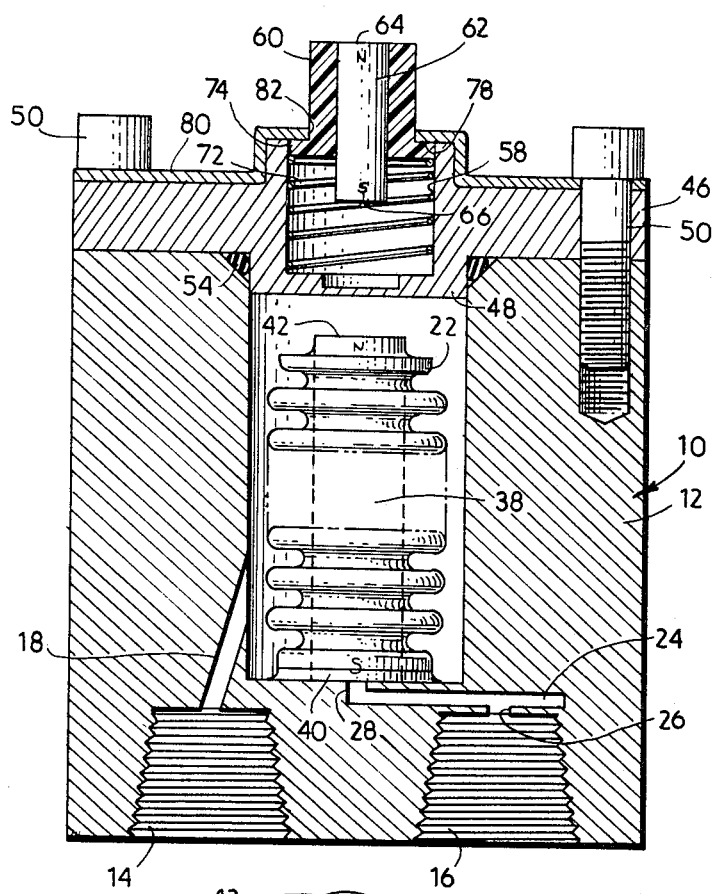
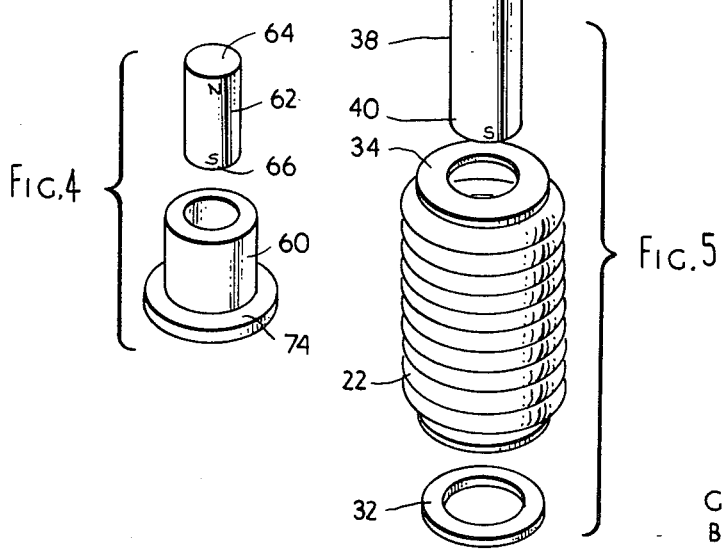

United States Patent Office 3,412,706
Patented Nov. 26, 1968

3,412,706
DIFFERENTIAL PRESSURE INDICATOR
George J. Topol, Hamilton, Ontario, Canada, and Barry A. Hinkle, Cookeville, Tenn., assignors to Bowser, Inc., Cookeville, Tenn., a corporation of Indiana
Filed Apr. 9, 1965, Ser. No. 446,975
4 Claims. (Cl. 116—70)

ABSTRACT OF THE DISCLOSURE

A device for measuring and indicating the pressure drop across a filter in a fluid line having a bellows enclosingly housing a first magnet in a housing with the exterior of the bellows being in communication with the upstream side of the filter and the interior of the bellows being in communication with the downstream side thereof so that the bellows expands and contracts responsive to a decrease and an increase in pressure drop as occasioned by the condition of the filter and a second magnet movably mounted in the housing in adjacency to a free moving end of the bellows and carrying an indicator with a spring bias means acting on the second magnet to move it from a non-indicating position where it is retained under the magnetic attraction forces between the magnets to an indicating position when the magnetic forces are lessened by the movement of the first magnet away from the second magnet a predetermined distance as the bellows contracts in reaction to an increase in the pressure drop.

---

This invention relates to a differential pressure indicator, and more particularly to a differential pressure indicator which is used for indicating when filter devices are clogged and need to be replaced.

In operation, a clear or unclogged filter is intended to produce a slight pressure drop when the fuel or other liquid being filtered passes through the filter element. With continued use, however, there develope an accumulation of contaminate on the filter element which offers a resistance to flow and a consequent pressure drop across the filter element so that the degree of pressure drop is related to the degree of contamination of the filter element. When this contamination becomes excessive it becomes evident in the form of a substantial pressure drop across the filter element and is a suitable indication of the need to replace the filter element. Therefore, by measuring the amount of pressure drop, and relating the degree thereof to the degree of contamination, it is possible to calibrate the pressure drop in relation to the degree of contamination and thereby determine the point at which the filter should be replaced.

It is, therefore, one of the principal objects of the present invention to provide a device which continuously monitors the condition of the filter by receiving and measuring the pressure drop across the filter, and providing an indication of filter contamination by relating the pressure drop to the condition of the filter element.

It is another object of the present invention to provide a simple device, having only a few number of components which are adapted to accurately and continuously measure the degree of contamination of a filter by measuring the amount of pressure drop across the filter and to provide a signal or indication, immediately upon occurrence of a predetermined degree of contamination by calibrating such degree of contamination to a pressure drop.

It is still a further object of the present invention to provide a monitoring device which can be readily reset following operation so that once it is operated it can be reset for operation without requiring any calibration or adjustment, the resetting being merely by depressing the signaling portion of the device.

It is a still further object to provide a signaling device which will, during normal operation with fuels, respond only to pressure differential which is directly related to the degree of contamination of the filter, and to no other parameter such as color change, temperature, or other extraneous factor.

It is an important feature of the present invention that the signaling device incorporates magnetically attracted devices which, when in close provimity with each other are sufficiently attracted to indicate a satisfactory condition of the filter but are separable by pressure differential which will weaken the magnetic attraction between the magnets to permit a resilient spring means to bias a signaling device to a signaling position. The spring force is effective, however, only when the magnets are separated by a pressure differential operating means which is responsive to contamination of the filters.

Other objects and features of the invention will become apparent from the consideration of the following description, which proceeds with reference to the accompanying drawings, wherein:

FIGURE 2 is the same section view as FIGURE 1 but in which the device has signaled a clogging condition for the filter;

FIGURE 4 is an isometric exploded view of the upper magnet and indicator; and

FIGURE 5 is an exploded view of the lower magnet and bellows.

Figure 3:
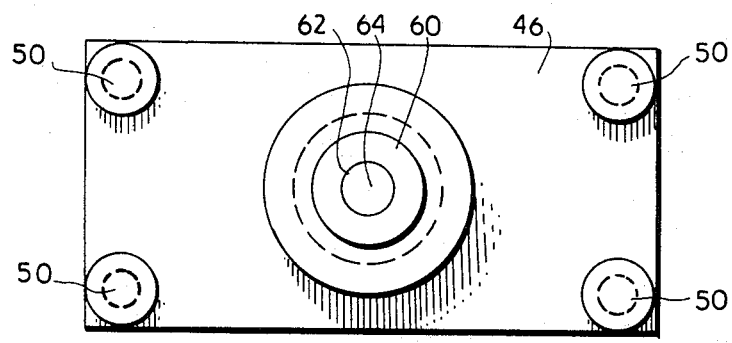
FIGURE 3 is a top view of the device, illustrated in FIGURE 1.

Referring now to the drawings, the monitor device indicated generally by reference numeral 10 includes a body 12 having threaded port openings 14 and 16 which are operatively connected to the high and low pressure zones of a filter (not shown). That is, the intake port 14 is operatively connected through suitable lines (not shown) to the point where fluid enters the filter and the outlet port 16 is connected likewise through suitable lines (not shown) to the outlet from the filter. There is thus communicated to the device static pressures at the upstream and downstream ends respectively of the filter and the device 10 operates to continuously monitor these pressures as differential pressures.

Port 14 is connected through line 18 to a chamber 20 in which is mounted a bellows 22 of any suitable construction, typically consisting however, of a tin-plated brass structure, this being mentioned as a material of construction only by way of example. The bellows is designed typically for as high as 250 p.s.i. (pounds per square inch). The exterior surface of the bellows 22 is subjected to the fluid pressure in chamber 20 which is the same as the pressure derived from the upstream end of the filter; port 16 in turn is connected through drill passages 24, 26 and 28 with the interior 30 of the bellows. The two opposite ends of the bellows are sealed by end plates 32 and 34 and bonded by epoxy, resin composition material 35. The end plates 32, 34 serve to provide fluid-tight separation between the interior and exterior of the bellows.

An end cap 46 includes an opening 58 which provides a bearing surface for an indicator 60 having an upper magnet 62 attached thereto with its north pole 64 oriented upwardly and its south pole end 66 oriented adjacent to north pole 42 of a lower magnet 38 to provide a magnetic field which tends to pull the two magnets 38, 62 together. The compositon of both the body 12 and the cap 46 is aluminum or other suitable nonmagnetic material separating the ends of the two magnets 38 and 62. The end 66 of the upper magnet 62 extends within a slight recess 70 of cap 46 so as to be in close proximity with the north pole end 42 of the lower magnet 38, thus increasing the magnetic attraction by reason of the close proximity of the two magnets.

Figure 1:
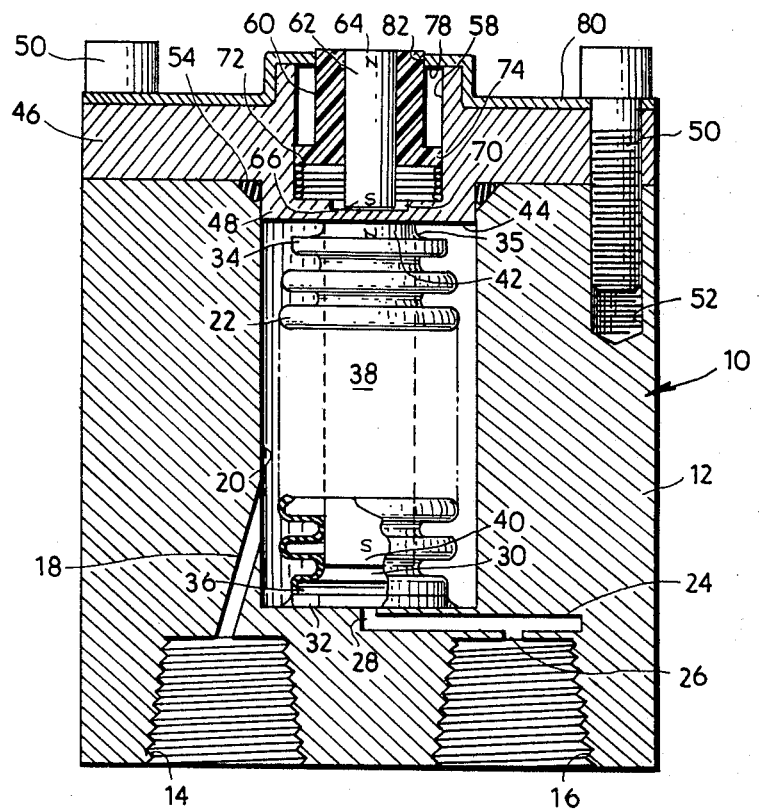
FIGURE 1 is a section view of the filter device with the parts positioned or set at the start of filtering operation and during which the filter is unclogged.

Within the opening 58 is a compressed coil spring 72 which opposes the magnetic attraction between the two magnets 38, 62, tending to bias the indicator 60 upwardly until its shoulder 74 engages the undersurface 78 of a retainer plate 80 which is secured by the bolts or screws 50 to the body 12. The end of the indicator 60 is extendible upwardly (FIG. 2) through an opening 82 of the retainer plate 80 from the lowered position (FIG. 1) to signal the need for replacing the filter.

The indicators are typically of a plastic composition and are generally of bright prominent colors such as bright red, or the like, and may be painted with a fluorescent paint in order to show even more prominently. The indicator 60 has its magnet 62 press fitted therein so that the two parts move together.

In operation, the ports 14 and 16 are connected with the upstream and downstream portions of a filter to be monitored. That is, the port 14 is in communication with fluid as it enters the filter and is responsive to the pressure of such fluid and the port 16 is in communication with the downstream end of the filter (that is, the fluid as it discharges from the filter), and is responsive to the pressure of such fluid. The two pressures are static pressures, that is hydrostatic pressures, and consequently there is no flow of fluid through the device 10.

Generally speaking, an unclogged filter, during normal filter operation will cause no substantial drop in fluid pressure as it moves through the filter or else the pressure drop will be very low across the filter ranging from about 0 to 5 p.s.i. pressure drop when the filter is operating at about 100 p.s.i. In time, however, as the filter becomes contaminated, and starts to clog, there will be developed a pressure drop across the filter which is related to the degree of contamination of the filter. After a time, as the filter starts to load up with contaminant there will eventually occur a sufficiently high differential pressure as a consequence of filter clogging to cause operation of the device 10, signaling the occurrence of an excessively contaminated filter which calls for its replacement.

As the pressure drop increases, the differential pressure builds up between chamber 20 and the interior 30 of the bellows 22, causing the bellows 22 to contract, moving the magnet 38 downwardly and displacing the north pole end 42 of the lower magnet 38 from the south pole 66 of the upper magnet 62. Such movement weakens the magnetic attraction between the two magnets until the weakened magnet attraction is overcome by the force of compressed spring pile 72 which biases the indicator 60 upwardly until shoulder 74 engages the undersurface 78 of the retainer 80 (FIG. 2). Thus the indicator 60 is displaced from the lowered portion shown in FIGURE 1 to that of FIGURE 2 and the raised portion which extends above the level of the retainer plate 80 is visible and is an indication of the need to replace the filter element.

After the filter element is replaced, the differential pressure of the upstream and downstream of the filter is again of such magnitude that the bellows 22 expand. This permits the north end 42 of the magnet 38 to move upwardly until it engages the undersurface 44 of boss 48 on the end plate 46. This indicator 60 is reset by pressing the indicator downwardly and compressing the spring 72 of the position shown in FIGURE 2 to that of FIGURE 1 and bringing the south end 66 of the magnet 62 into proximity with the north end 42 of the magnet 38 so that the magnetic attractive forces between the two magnets 38 and 62 is sufficient to overcome the resistance of the compressed spring 72. The indicator 60 will remain in the position shown in FIGURE 1 until the bellows 22 is again depressed separating the adjacent north and south pole ends of magnet 38 and 62 respectively because of the pressure drop which indicates a need to once more change the filter.

Once a magnitude of differential pressure is developed the filter is in need of replacement and the device will signal such fact.

The device, comprising as it does only a relatively few number of parts, is virtually free of malfunctioning, and because it operates on a hydrostatic pressure basis, it does not itself contribute to any pressure drop and is sensitive only to the degree of contamination of the filter. That is, the device, during normal operation with fuel, is not operative by such extraneous factors as temperature of the fluid or color of the fluid because both the interior and exterior of the bellows are affected equally; nor, does the gauge pressure of the fluid in any way affect operation of the device.

The device is relatively inexpensive to produce, to operate, and to maintain because of the few number of parts, its relative ease of assembly and disassembly, and the ready method for coupling it into the system. Of further advantage is the ready manner which is provided to reset the device as the need arises.

Although the present invention has been illustrated and described in connection with a single example embodiment, it will be understood that this is illustrative of the invention and is by no means restrictive thereof. It is reasonably to be expected that those skilled in this art can make numerous revisions and adaptations of the invention and it is intended that such revisions and adaptations will be included within the scope of the following claims as equivalents of the invention.

What is claimed is:

1. A pressure indicating device, especially for monitoring the pressure drop across and hence the condition of a filter in a fluid line, comprising a housing having a chamber therein, a closed flexible bellows longitudinally positioned in the chamber for expansion and contraction movement along its longitudinal axis within the chamber, said bellows having opposing ends, means sealingly mounting one of the ends within the chamber so as to locate the bellows and seal the interior of the bellows from communication with the chamber, said other end being closed and free for movement in the chamber, said housing having a fluid inlet duct means communicating the chamber and the exterior of the bellows with a line carrying a fluid under pressure and having a fluid outlet duct means communicating the fluid line through the one end of the bellows with the interior of the bellows so that the bellows is responsive to the pressure conditions in the line and is adapted to contract in response to an increase in pressure drop in the line and to expand in response to a decrease in the pressure drop, a first magnet positioned axially within the bellows between the ends thereof for movement within the bellows relative to the free end thereof as it expands and contracts, a second magnet, means forming a part of said housing movably supporting the second magnet for movement from a first position adjacent the first magnet at the other end of the bellows to a second position away from the first magnet, said second magnet being retained in the first position by magnetic attraction forces between the magnets when the bellows is expanded, an indicator means carried by the second magnet for movement from a nonindicating position when the second magnet is in its first position to an indicating position when the second magnet is in its second position and spring means normally urging the second magnet to its second position, said spring means being operatively engaged with the second magnet in opposition to the magnetic attraction between the first and the second magnets for urging the second magnet to its second position when the magnetic forces are lessened by the movement of the first magnet away from the second magnet a predetermined distance as the bellows contracts in reaction to an increase in pressure drop in the line.

2. The device of claim 1 wherein said housing has opposing end walls at the ends of the chamber, one end will closing off one end of the chamber with the inlet and outlet duct means being formed in said one end wall and the said one end of the bellows having its mounting means fixed to said one end wall and having an opening in communication with the outlet duct means formed in said one end wall.

3. The device of claim 2 wherein the other end wall constitutes the part of the housing movably supporting the second magnet and is removable from the housing, means removably mounting said other end wall in place on the housing to close off the other end of the chamber, said other end wall having a bore formed therein in longitudinal alignment with the chamber and the bellows therein, and said second magnet being slidably mounted in the bore.

4. The device of claim 3 wherein said indicator means includes a non-magnetic sleeve circumposed on the second magnet and having an inner end defining a shoulder, said bore having an inner closed end and said spring means including a coil spring mounted between the inner end of the bore and the shoulder and said bore extending through the outer surface of the other end wall for the external protrusion of the sleeve beyond the outer surface of the other end wall in the second position of the second magnet.

References Cited

UNITED STATES PATENTS

| 2,497,255 | 2/1950 | Brown | 73—407 |
|---|---|---|---|
| 2,927,176 | 3/1960 | Auld, et al. | 73—228 |
| 2,943,446 | 7/1960 | Goodall et al. | 210—90 |
| 3,056,379 | 10/1962 | Thomas | 116—70 |
| 3,062,054 | 11/1962 | Fitch | 73—410 |
| 3,077,854 | 2/1963 | Pall | 116—70 |
| 3,109,908 | 11/1963 | Clason | 200—83 |
| 3,125,062 | 3/1964 | Raupp et al. | 116—117 |
| 3,128,743 | 4/1964 | Whiting | 116—70 |
| 3,140,690 | 7/1964 | Siebel | 116—70 |
| 3,154,049 | 10/1964 | Smith et al. | 116—70 |
| 3,178,943 | 4/1965 | Guillory | 116—70 |
| 3,187,711 | 6/1965 | Campolong | 116—70 |

FOREIGN PATENTS 895,748   5/1962   Great Britain.

LOUIS J. CAPOZI, *Primary Examiner.*